United States Patent
Li et al.

(10) Patent No.: US 11,330,493 B2
(45) Date of Patent: May 10, 2022

(54) TRANSMISSION CONTROL METHOD, APPARATUS, AND SYSTEM

(71) Applicant: Huawei Technologies Co., Ltd., Shenzhen (CN)

(72) Inventors: Yongcui Li, Beijing (CN); Yan Li, Beijing (CN); Ruizhi Liu, Shenzhen (CN); Hui Ni, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 90 days.

(21) Appl. No.: 16/839,652

(22) Filed: Apr. 3, 2020

(65) Prior Publication Data
US 2020/0236604 A1    Jul. 23, 2020

Related U.S. Application Data

(63) Continuation of application No. PCT/CN2018/088860, filed on May 29, 2018.

(30) Foreign Application Priority Data

Feb. 13, 2018   (CN) .......................... 201810149721.7

(51) Int. Cl.
*H04W 36/14* (2009.01)
*H04W 36/00* (2009.01)
*H04W 80/10* (2009.01)

(52) U.S. Cl.
CPC ....... *H04W 36/14* (2013.01); *H04W 36/0016* (2013.01); *H04W 36/0033* (2013.01); *H04W 36/0055* (2013.01); *H04W 80/10* (2013.01)

(58) Field of Classification Search
CPC ........... H04L 1/1607; H04L 2001/0097; H04L 5/0053; H04L 5/0091; H04W 36/00;
(Continued)

(56) References Cited

U.S. PATENT DOCUMENTS 10,462,840 B2 * 10/2019 Dao .................. H04W 36/0022
10,820,368 B2 * 10/2020 Dao ...................... H04L 67/148
(Continued)

FOREIGN PATENT DOCUMENTS

| CN | 101094509 A | 12/2007 |
|---|---|---|
| CN | 101365239 A | 2/2009 |

(Continued)

OTHER PUBLICATIONS

Huawei, et al., "TS 23.502 End-Marker during HO Procedure," SA WG2 Meeting #123, S2-177861, Oct. 23-27, 2017, Ljubljana, Slovenia, 14 pages.
(Continued)

*Primary Examiner* — Ahmed Elallam
(74) *Attorney, Agent, or Firm* — Conley Rose, P.C.

(57) ABSTRACT

A transmission control method including in a re-allocation process of a first user plane function network element to a second user plane function network element, a session management function network element sends a respective session modification request to each anchor user plane function network element of a plurality of anchor user plane function network elements, where each session modification request includes information about the second user plane function network element; and indicates to only a first anchor user plane function network element in the plurality of anchor user plane function network elements to send an end marker; or sends the end marker to only the first anchor user plane function network element.

20 Claims, 8 Drawing Sheets

---

501. In a re-allocation process of a first user plane function network element to a second user plane function network element, a session management function network element sends a respective session modification request of a plurality of session medication requests to each anchor user plane function network element of a plurality of anchor user plane function network elements, wherein each session modification request includes information about the second user plane function network element

↓

502. The session management function network element indicates to only a first anchor user plane function network element in the plurality of anchor user plane function network elements to send an end marker, or sends the end marker to only the first anchor user plane function network element

(58) Field of Classification Search
CPC ......... H04W 36/0011; H04W 36/0016; H04W 36/0027; H04W 36/0033; H04W 36/0055; H04W 36/14; H04W 80/10
See application file for complete search history.

(56) References Cited

U.S. PATENT DOCUMENTS

| | | | |
|---|---|---|---|
| 2010/0260473 | A1 | 10/2010 | Newell et al. |
| 2016/0156984 | A1 | 6/2016 | Newell et al. |
| 2016/0242081 | A1 | 8/2016 | Worrall et al. |
| 2018/0199243 | A1* | 7/2018 | Bharatia ............ H04W 36/0027 |
| 2018/0249364 | A1 | 8/2018 | Chen et al. |
| 2019/0357106 | A1 | 11/2019 | Ke et al. |
| 2020/0120570 | A1* | 4/2020 | Youn ................. H04W 36/0033 |
| 2021/0051761 | A1* | 2/2021 | Kahn .................... H04W 76/12 |
| 2021/0211960 | A1* | 7/2021 | Ryu ...................... H04W 36/14 |

FOREIGN PATENT DOCUMENTS

| | | |
|---|---|---|
| CN | 101754373 A | 6/2010 |
| CN | 102905323 A | 1/2013 |
| CN | 105580430 A | 5/2016 |
| CN | 106851856 A | 6/2017 |
| CN | 106941733 A | 7/2017 |
| CN | 107548127 A | 1/2018 |
| CN | 107005537 B | 10/2020 |
| EP | 2187664 A1 | 5/2010 |
| WO | 2017222344 A1 | 12/2017 |

OTHER PUBLICATIONS

Samsung, "23.502: Update of UE triggered Service Request in CM-CONNECED state," SA WG2 Meeting #122, S2-174617, Jun. 26-30, 2017, San Jose, Del Cabo, Mexico, 4 pages.
3GPP TS 23.501, V15 0.0, Dec. 2017, "3rd Generation Partnership Project; Technical Specification Group Services and System Aspects; System Architecture for the 5G System; Stage 2 (Release 15)," 181 pages.
3GPP TS 23.502, V15 0.0, Dec. 2017, "3rd Generation Partnership Project; Technical Specification Group Services and System Aspects; Procedures for the 5G System; Stage 2 (Release 15)," 257 pages.
Huawei et al., "OI#18 TS 23.501: Interaction between SMF and UPF on N4 Reference Point," SA WG2 Meeting #123 S2-178097, (revision of S2-177868), Oct. 23-27, 2017, Ljubljana, Slovenia, 10 pages.
Ericsson, "23.502: end marker handling," SA WG2 Meeting #124 S2-178565, Nov. 27-Dec. 1, 2017, Reno, US, 9 pages.
Nokia, et al., "23.501: Editorial corrections and EN Removal," SA WG2 Meeting # SA WG2 Meeting #124, S2-179619, Nov. 27-Dec. 1, 2017, Reno, Nevada, USA, 159 pages.
ETRI et al., "TS 23.501 Clarification of SSC Modes," SA WG2 Meeting#121, S2-173919, May 15-19, 2017, Hangzhou, China, 7 pages.
Ericsson, "Editorial corrections and alignment,"SA WG2 Meeting #124, S2-179097, Nov. 27-Dec. 1, 2017, Reno, Nevada (USA), 197 pages.
Catt, "SMF behaviour based on LADN notification",3GPP TSG-SA WG2 Meeting #126, S2-181493, Montreal, Canada, Feb. 26-Mar. 2, 2018, 10 pages.
SA WG2 Meeting #123, S2-178188, "Editorial corrections and alignment," Ericsson (Rapporteur),Oct. 23-27, 2017, Ljubljana, Slovenia, 154 pages.
SA WG2 Meeting #124, S2-179096,23.501: "Editorial corrections and EN Removal," Nokia, Nokia Shanghai Bell (Rapporteur),Nov. 27-Dec. 1, 2017, Reno, Nevada, USA, 3 pages.
SA WG2 Meeting #122bis, S2-175453, "Alignment and correction of terminologies for PDU Session Establishment/Release and User Plane Activation/Deactivation," Ericsson, Aug. 21-25, 2017, Sophia Antipolis, France, 31 pages.
SA WG2 Meeting #S2-120, S2-172092, "TS 23.502: Update of Xn based inter NG RAN handover without user plane function relocation in 4.9.1.1," Huawei, HiSilicon, Mar. 27-31, 2017, Busan, South Korea, 4 pages.

* cited by examiner

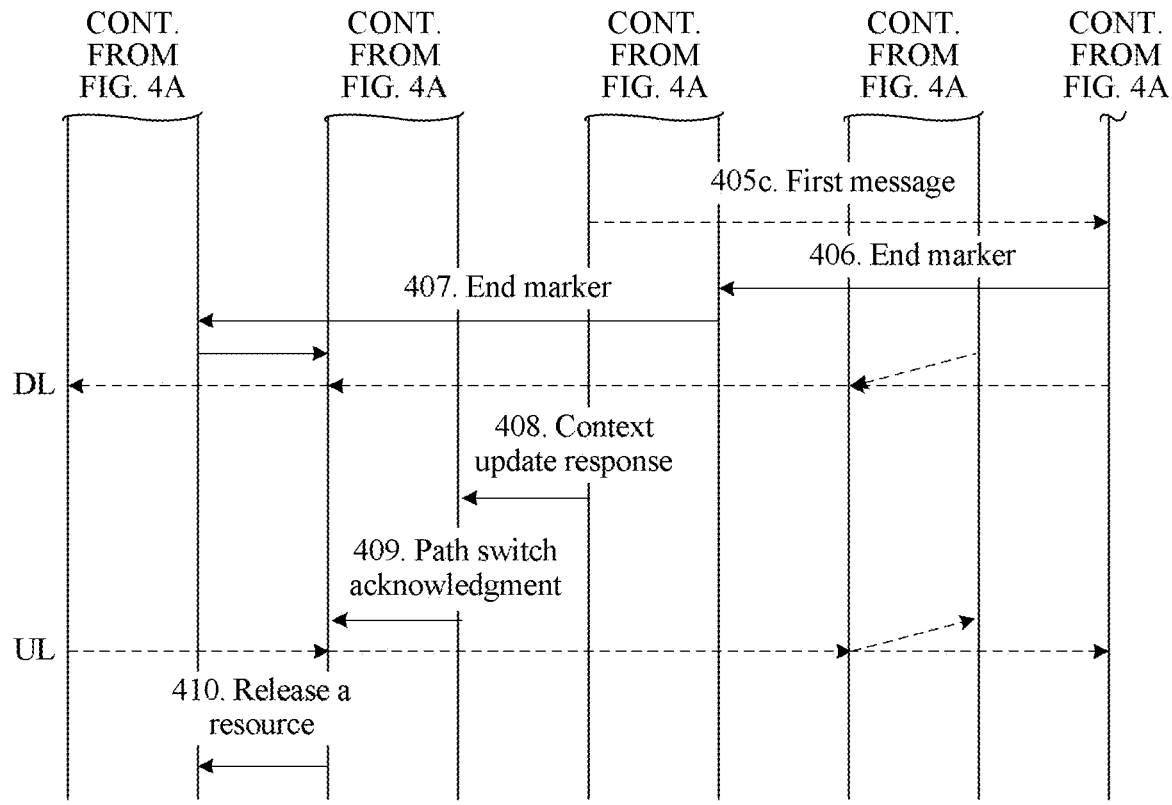

FIG. 4B

501. In a re-allocation process of a first user plane function network element to a second user plane function network element, a session management function network element sends a respective session modification request of a plurality of session medication requests to each anchor user plane function network element of a plurality of anchor user plane function network elements, wherein each session modification request includes information about the second user plane function network element 502. The session management function network element indicates to only a first anchor user plane function network element in the plurality of anchor user plane function network elements to send an end marker, or sends the end marker to only the first anchor user plane function network element

FIG. 5

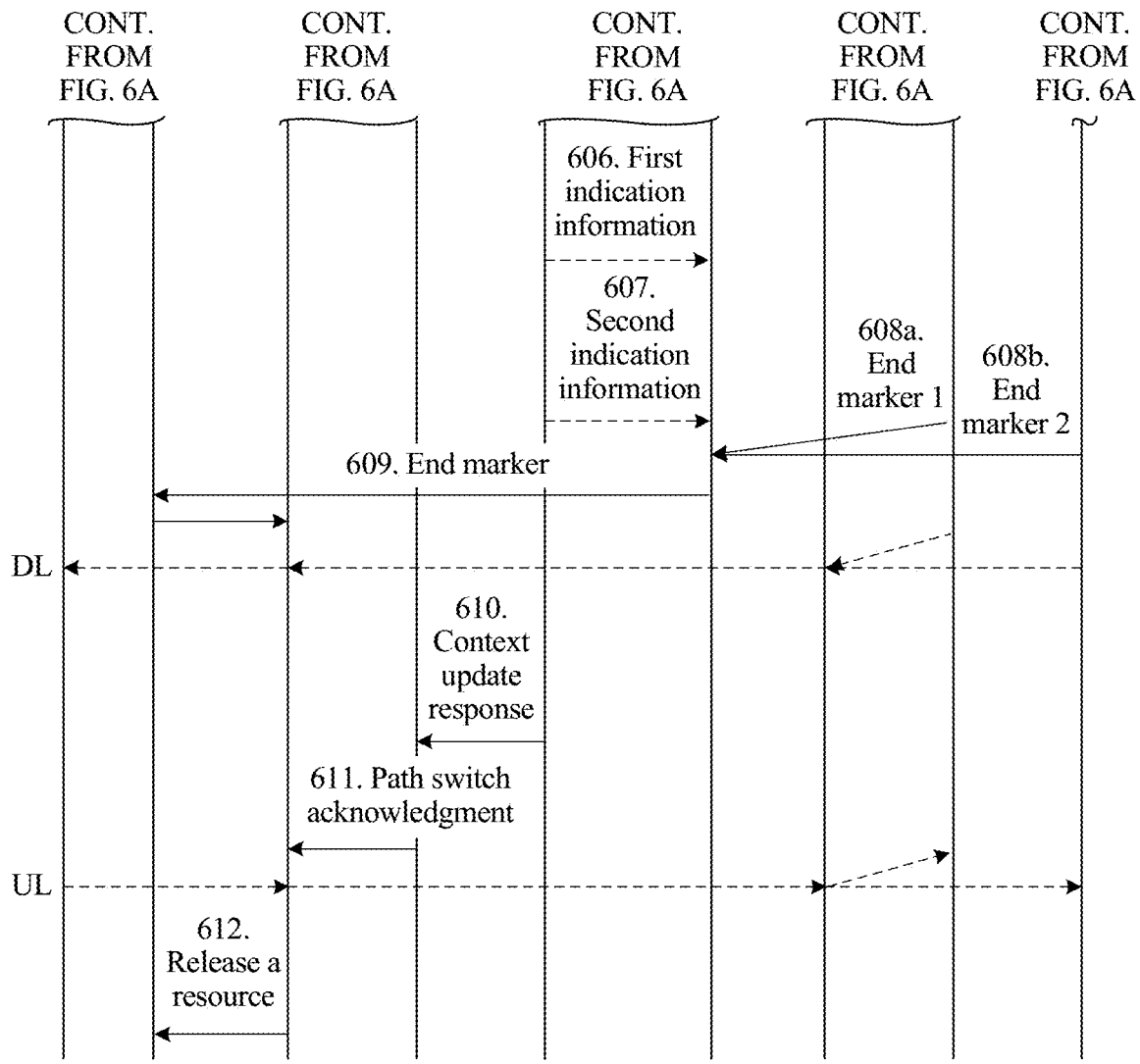

711. A session management function network element determines that a first user plane function network element transceives data packets of a first session on a plurality of paths 712. The session management function network element sends first indication information to the first user plane function network element, where the first indication information is used for determination of a first path and indicates to the first user plane function network element to send, after receiving a first end marker on the first path, the first end marker to an access network device, and the first path is a path for last sending an end marker in the plurality of paths

FIG. 7B

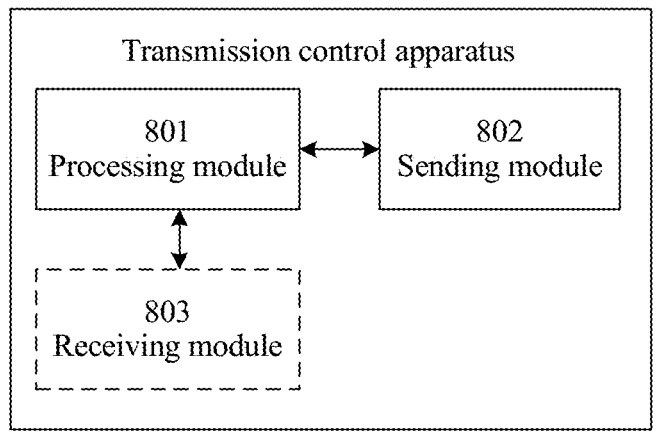

FIG. 8

TRANSMISSION CONTROL METHOD, APPARATUS, AND SYSTEM

CROSS-REFERENCE TO RELATED APPLICATIONS

This application is a continuation of International Patent Application No. PCT/CN2018/088860, filed on May 29, 2018, which claims priority to Chinese Patent Application No. 201810149721.7, filed on Feb. 13, 2018. The disclosures of the aforementioned applications are hereby incorporated by reference in their entireties.

TECHNICAL FIELD

The present disclosure relates to the field of communications technologies, and in particular, to a transmission control method, apparatus, and system.

BACKGROUND

In the $5^{th}$-generation (5G) communications network, after user equipment (UE) moves, a data transmission path may be switched. For example, as shown in FIG. 1A, before the UE moves, a transmission path of downlink data is: an anchor user plane function (UPF)→a source intermediate UPF (I-UPF)→a source radio access network (RAN). After the UE moves, in a handover process, a transmission path of a downlink data packet (an old path) is: the anchor UPF→the source I-UPF→the source RAN→a target RAN (as shown by a dashed line in the figure). After the handover is completed, a transmission path of a downlink data packet (a new path) is: the anchor UPF→a target I-UPF→a target RAN (as shown by a solid line in the figure). Therefore, the downlink data packet reaches the target RAN on the new path and the old path separately.

To ensure that the downlink data packet is not out-of-order, the target RAN needs to first send the downlink data packet on the old path to the UE, and then send the downlink data packet on the new path to the UE. An end marker per packet data unit (PDU) session mechanism is used in some approaches. In this mechanism, the anchor UPF needs to send the end marker on the old path when a path is updated, and the end marker indicates that this is a last downlink data packet on the old path, and a subsequent downlink data packet will be transmitted on the new path.

For a scenario of a plurality of transmission paths, the UE has a plurality of session branches, as shown in FIG. 1B. Before the UE moves, an established session may be offloaded by using a source I-UPF. For example, the source I-UPF has two session branches, a branch 1 corresponds to an anchor UPF 1, and a branch 2 corresponds to an anchor UPF 2. When re-allocation of an I-UPF occurs, there may be two cases. A case 1, both branches are switched to a target side. A case 2, only a primary branch (such as branch 1) is switched to the target side, while a secondary branch (such as branch 2) is not switched.

For either of the foregoing cases, for example, the branch 1 is switched, and after all data packets on the branch 1 are sent, the anchor UPF 1 sends an end marker to a target RAN via a source RAN. After receiving the end marker, the target RAN considers that transmission of the downlink data packets on the old paths ends, and starts to send the downlink data packets on the new paths to the UE. However, transmission of downlink data packets on the branch 2 may not be completed. Because these data packets are received after the end marker is received, the target RAN directly discards these data packets. This causes a data packet loss, reducing user experience.

SUMMARY

Embodiments of the present disclosure provide a transmission control method, apparatus, and system.

According to a first aspect, an embodiment of this application provides a transmission control method, and the method includes in a re-allocation process of a first user plane function network element to a second user plane function network element, sending, by a session management function network element, a respective session modification request of a plurality of session modification requests to each anchor user plane function network element of a plurality of anchor user plane function network elements, where each session modification request includes information about the second user plane function network element; and indicating to, by the session management function network element, only a first anchor user plane function network element in the plurality of anchor user plane function network elements to send an end marker; or sending the end marker to only the first anchor user plane function network element.

In a possible design, the sending, by a session management function network element, a respective session modification request of a plurality of session modification requests to each anchor user plane function network element of a plurality of anchor user plane function network elements includes first sending, by the session management function network element, a first session modification request to another anchor user plane function network element other than the first anchor user plane function network element in the plurality of anchor user plane function network elements, and then sending a second session modification request to the first anchor user plane function network element. Therefore, the session management function network element indicates to only an anchor user plane function network element that last updates a path to send the end marker. In this way, the end marker, sent by the anchor user plane function network element that last updates the path, is used to indicate that packet transmission on old paths is completed. Therefore, using the foregoing method may avoid a data packet loss on the old path, improving user experience.

In a possible design, the indicating to, by the session management function network element, only a first anchor user plane function network element to send an end marker; or sending the end marker to only the first anchor user plane function network element includes after the session management function network element sends the respective session modification request to each another anchor user plane function network element other than the first anchor user plane function network element in the plurality of anchor user plane function network elements, indicating to, by the session management function network element, the first anchor user plane function network element to send the end marker, or sending the end marker to the first anchor user plane function network element. For example, the session management function network element indicates to, by using the session modification request sent to the first anchor user plane function network element, the first anchor user plane function network element to send the end marker, or the session modification request includes the end marker; or the session management function network element indicates to, by using a first message sent to the first anchor user plane function network element, the first anchor user plane function network element to send the end marker, or the first message includes the end marker.

In a possible design, the method further includes determining, by the session management function network element, the first anchor user plane function network element. For example, the first anchor user plane function network element includes a remote user plane function network element or a home user plane function network element. The session management function network element may determine the remote user plane function network element or the home user plane function network element as the anchor user plane function network element that last updates the path, so as to achieve the foregoing effect.

According to a second aspect, an embodiment of this application provides a transmission control method, and the method includes transceiving, by a first user plane function network element, data packets on a plurality of paths; and after receiving a first end marker on a first path, sending, by the first user plane function network element, the first end marker to an access network device. The first path is a path for last sending the end marker in the plurality of paths.

According to the foregoing method, the first user plane function network element sends, after receiving the last sent end marker, the end marker to the access network device. In this way, the end marker, sent by an anchor user plane function network element that last updates a path, is used to indicate that packet transmission on old paths is completed. Therefore, using the foregoing method may avoid a data packet loss on the old path, improving user experience.

In a possible design, the method further includes receiving, by the first user plane function network element, a second end marker on a second path in the plurality of paths, and discarding the second end marker. The second path is any path for not last sending the end marker in the plurality of paths. In this way, a storage resource of the first user plane function network element may be saved.

In a possible design, the method further includes receiving, by the first user plane function network element, first indication information from a session management function network element, where the first indication information indicates to the first user plane function network element to send, after receiving the first end marker on the first path, the first end marker to the access network device. For example, in a process of inserting the first user plane function network element, or in a process of re-allocating the first user plane function network element, the first user plane function network element receives the first indication information from the session management function network element.

In a possible design, the first indication information includes quantity information, and the quantity information indicates a quantity of paths for sending the end marker in the plurality of paths.

In a possible design, the method further includes determining, by the first user plane function network element, the first path based on the first indication information. For example, when receiving the end marker whose quantity is equal to the quantity of the paths for sending the end marker in the plurality of paths, the first user plane function network element determines the path for last sending the end marker as the first path.

In a possible design, the data packets transceived on the plurality of paths are data packets of a first session. The method further includes receiving, by the first user plane function network element, second indication information from the session management function network element; detecting a downlink data packet of the first session based on the second indication information; and determining the downlink data packet as the end marker based on a detection result. For example, in a process of inserting the first user plane function network element, or in a process of re-allocating the first user plane function network element, the first user plane function network element receives the second indication information from the session management function network element.

According to a third aspect, an embodiment of this application provides a transmission control method, and the method includes determining, by a session management function network element, that a first user plane function network element transceives data packets of a first session on a plurality of paths; and sending, by the session management function network element, first indication information to the first user plane function network element. The first indication information is used for determination of a first path and indicates to the first user plane function network element to send, after receiving a first end marker on the first path, the first end marker to an access network device. The first path is a path for last sending the end marker in the plurality of paths.

According to the foregoing method, the session management function network element sends the first indication information to the first user plane function network element. The first user plane function network element sends, after receiving the last sent end marker, the end marker to the access network device based on the first indication information. In this way, the end marker, sent by an anchor user plane function network element that last updates a path, is used to indicate that packet transmission on old paths is completed. Therefore, using the foregoing method may avoid a data packet loss on the old path, improving user experience.

In a possible design, the first indication information includes quantity information, and the quantity information indicates a quantity of paths for sending the end marker in the plurality of paths.

In a possible design, the sending, by the session management function network element, first indication information to the first user plane function network element includes in a process of inserting the first user plane function network element, or in a process of re-allocating the first user plane function network element, sending, by the session management function network element, the first indication information to the first user plane function network element.

In a possible design, the method further includes sending, by the session management function network element, second indication information to the first user plane function network element, where the second indication information is used for detection of a downlink data packet of the first session at the first user plane function network element. For example, in the process of inserting the first user plane function network element, or in the process of re-allocating the first user plane function network element, the session management function network element sends the second indication information to the first user plane function network element.

In a possible design, the method further includes determining, by the session management function network element, that a third path in the plurality of paths of the first session is not switched; and sending, by the session management function network element, an end marker or third indication information to an anchor user plane function network element corresponding to the third path, where the third indication information indicates to the anchor user plane function network element to send an end marker on the third path. In other words, the end marker needs to be sent on the path regardless of whether the path is switched.

According to a fourth aspect, an embodiment of this application provides a transmission control apparatus. The apparatus may be a session management function network element or may be a chip. The apparatus has a function of implementing behavior of a session management function network element in the first aspect, the third aspect, or various possible designs of the first aspect and the third aspect. The function may be implemented by hardware, or may be implemented by hardware by executing corresponding software. The hardware or the software includes one or more modules corresponding to the function. In a possible design, a structure of the apparatus includes a processor and a transceiver, and the processor is configured to perform a corresponding function in the first aspect, the third aspect, or various possible designs of the first aspect and the third aspect. The transceiver is configured to implement communication between the apparatus and a first user plane function network element or each anchor user plane function network element. The apparatus may further include a memory. The memory is configured to be coupled to the processor, and store a program instruction and data that are required by the apparatus.

According to a fifth aspect, an embodiment of this application provides a transmission control apparatus. The apparatus may be a user plane function network element or may be a chip. The apparatus has a function of implementing behavior of a first user plane function network element in the second aspect, or various possible designs of the second aspect. The function may be implemented by hardware, or may be implemented by hardware by executing corresponding software. The hardware or the software includes one or more modules corresponding to the function. In a possible design, a structure of the apparatus includes a processor and a transceiver, and the processor is configured to perform a corresponding function in the second aspect, or various possible designs of the second aspect. The transceiver is configured to implement communication between the apparatus and a session management function network element, each anchor user plane function network element, or an access network device. The apparatus may further include a memory. The memory is configured to be coupled to the processor, and store a program instruction and data that are required by the apparatus.

According to a sixth aspect, an embodiment of this application provides a transmission control system, where the system includes a session management function network element configured to perform the method in the first aspect or various possible designs of the first aspect, and each anchor user plane function network element configured to transmit a data packet. Alternatively, the system includes a first user plane function network element configured to perform the method in the second aspect or various possible designs of the second aspect, and a session management function network element configured to perform the method in the third aspect or various possible designs of the third aspect.

According to a seventh aspect, an embodiment of this application further provides a computer-readable storage medium, and the computer-readable storage medium stores an instruction. When the instruction runs on a computer, the computer is enabled to perform the methods in the foregoing aspects.

According to an eighth aspect, an embodiment of this application provides a computer program product that includes an instruction. When the instruction runs on a computer, the computer is enabled to perform the methods in the foregoing aspects.

Using the solution can resolve a packet loss problem for a downlink data packet in a scenario of re-allocating a user plane function network element, improving user experience.

BRIEF DESCRIPTION OF DRAWINGS

FIG. 4A and FIG. 4B are a signaling interaction diagram of a transmission control method according to an embodiment of this application;

FIG. 5 is a flowchart of a transmission control method according to an embodiment of this application;

FIG. 6A and FIG. 6B are a signaling interaction diagram of a transmission control method according to another embodiment of this application;

FIG. 7A is a flowchart of a transmission control method according to another embodiment of this application;

FIG. 7B is another flowchart of a transmission control method according to another embodiment of this application;

FIG. 8 is a schematic structural diagram of a transmission control apparatus according to an embodiment of this application;

DESCRIPTION OF EMBODIMENTS

The following clearly describes the technical solutions in the embodiments of this application with reference to the accompanying drawings in the embodiments of this application.

In a 5G mobile network architecture, a core network includes a control plane network element and a user plane network element. The control plane network element is a unified control plane that integrates a conventional $3^{rd}$ Generation Partnership Project (3GPP) control network element mobility management entity (MME), control plane functions of a serving gateway (SGW) and a packet data network gateway (PGW), and the like. The user plane function network element can implement user plane functions of the SGW and the PGW (SGW-U and PGW-U). Further, a unified control plane network element may be decomposed into an access and mobility management function (AMF) network element and a session management function (SMF) network element.

Figure 2A:
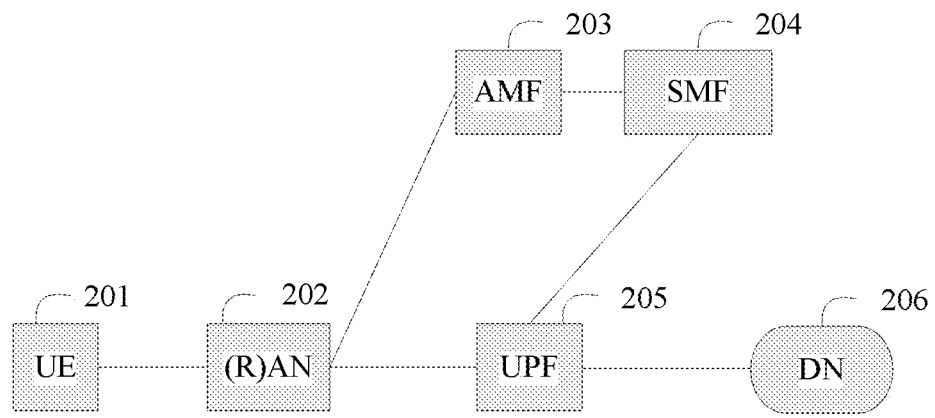
FIG. 2A is a schematic diagram of a 5G communications system.

FIG. 2A is a schematic diagram of a 5G communications system according to an embodiment of this application. As shown in FIG. 2A, the communications system includes at least UE 201, an access network (AN) device 202, an AMF network element 203, an SMF network element 204, and a user plane function (UPF) network element 205.

The UE 201 included in this system is not limited to a 5G network, and includes a mobile phone, an Internet of Things device, a smart household device, an industrial control device, a vehicle device, or the like. The user equipment may also be referred to as a terminal, a terminal device, a mobile station, a mobile console, a remote station, a remote terminal, an access terminal, a user terminal, or a user agent, and this is not limited herein. The user equipment may also be a vehicle in vehicle to vehicle (V2V) communication, a machine in machine type communication, or the like.

The AN device 202 is an apparatus configured to provide a wireless communication function for the UE 201. The AN device 202 may be a radio access network (RAN) device. The RAN device may include various base stations such as a macro base station, a micro base station (also referred to as a small cell), a relay station, or an access point. In systems that use different radio access technologies, names of devices that have functions of a base station may be different. For example, in a $3^{rd}$ generation (3G) system, a device having the functions of the base station is referred to as a NodeB; in a Long Term Evolution (LTE) system, a device having the functions of the base station is referred to as an evolved NodeB (eNB or eNodeB); or in the $5^{th}$ generation system, a device having the functions of the base station is referred to as a gNB or gNodeB.

The AMF network element 203 may be responsible for registration, mobility management, a tracking area update procedure, and the like of the UE 201.

The SMF network element 204 may be responsible for session management of the UE 201. For example, the session management includes establishment, modification, or release of a session, selection or reselection of the UPF network element, allocation of an Internet Protocol (IP) address, and the like.

The UPF network element 205 may be connected to a data network (DN) 206 and be configured to implement transmission of a service data packet.

The foregoing network elements may further be referred to as a device or an entity. For example, the AMF network element may also be referred to as an AMF device or an AMF entity.

The foregoing network elements may be implemented by specified hardware, or may be implemented by a software instance on specified hardware, or may be implemented by a virtual function instantiated on an appropriate platform. This is not limited in the present disclosure.

Figure 2B:
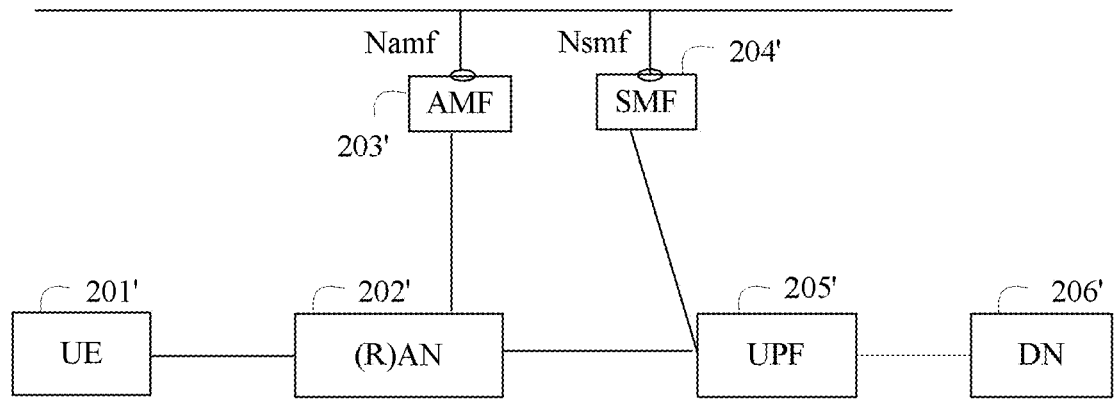
FIG. 2B is another schematic diagram of a 5G communications system in a service framework.

For example, FIG. 2B is another schematic diagram of a 5G communications system in a service framework. Similarly, the communications system includes at least UE 201', an AN device 202', an AMF network element 203', an SMF network element 204', and a UPF network element 205'. Functions of the UE 201', the AN device 202', the AMF network element 203', the SMF network element 204', and the UPF network element 205' in FIG. 2B are the same as functions of the UE 201, the AN device 202, the AMF network element 203, the SMF network element 204, and the UPF network element 205 in FIG. 2A, respectively. Details are not described herein again.

In the service framework, a service-based interface is used on a control plane. For example, the AMF network element 203' and the SMF network element 204' respectively have service-based interfaces Namf and Nsmf. A function network element may open up its capability to another authorized function network element by using the service-based interface, so as to provide a network function (NF) service. In other words, the NF service is various capabilities that can be provided.

In addition, this embodiment of this application may further be applied to another future-oriented communications technology. Network architectures and service scenarios described in this application are intended to describe the technical solutions in this application more clearly, but are not intended to limit the technical solutions provided in this application. A person of ordinary skill in the art may know that as the network architectures evolve and a new service scenario emerges, the technical solutions provided in this application are also applied to a similar technical problem.

This application is intended to provide a transmission control solution in a single-session and multi-session anchor scenario. For example, to support offloading of a local service flow, an SMF may control a data path of a single PDU session, so that the PDU session corresponds to a plurality of N6 interfaces at the same time. The N6 interface is an interface between a UPF and a DN. The UPF that terminates the N6 interface may be referred to as an anchor UPF. Therefore, each anchor UPF provides a different access path connected to a same DN. In other words, one PDU session has a plurality of paths (which may also be referred to as a plurality of branches) corresponding to different anchor UPFs.

For example, the single-session and multi-session anchor scenario includes a ULCL scenario or an IPv6 multi-homing session scenario.

Figure 3A:
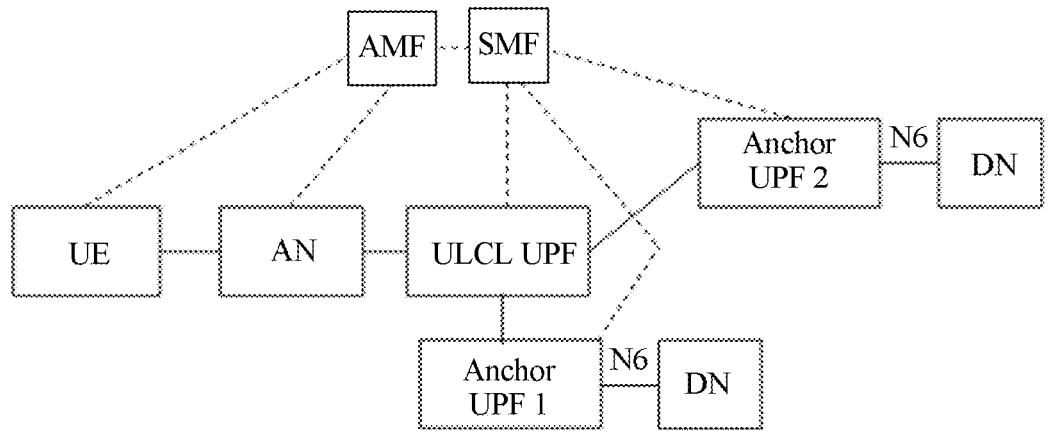
FIG. 3A is a schematic diagram of an uplink classifier (ULCL)

FIG. 3A is a schematic diagram of a ULCL scenario. For example, for a PDU session of the Internet Protocol version 4 (IPv4), the IPv6, or the Ethernet types, an SMF may determine to insert a ULCL UPF into a data path of the PDU session. The ULCL UPF offloads an uplink service flow to different anchor UPFs (such as an anchor UPF 1 and an anchor UPF 2 in FIG. 3A) on different branches, or combines downlink service flows from different branches and then sends the combined downlink service flows to UE. The anchor UPF 1 is a local user plane function network element (local UPF), and the anchor UPF 2 is a remote user plane function network element (remote UPF). The UE does not perceive the offloading of the ULCL. For the PDU session of the IPv4 or the IPv6 type, the UE associates a single IPv4 address or a single IPv6 prefix with the PDU session.

In addition, there may be a plurality of ULCL UPFs in the data path of the PDU session. One UPF may also have functions of both the ULCL UPF and the anchor UPF.

Figure 3B:
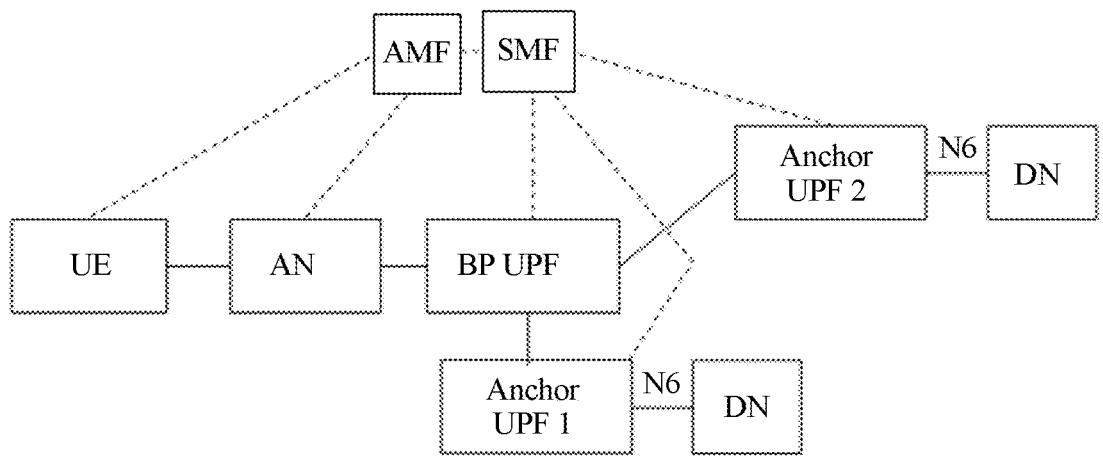
FIG. 3B is a schematic diagram of an Internet Protocol version 6 (IPv6) multi-homing session.

FIG. 3B is a schematic diagram of an IPv6 multi-homing session scenario. For an IPv6 multi-homing session, one PDU session may be associated with a plurality of IPv6 prefixes. Similarly, different anchor UPFs (such as an anchor UPF 1 and an anchor UPF 2 in the figure) provide different access paths (e.g., branches) connected to a same DN. After converging on a UPF that supports a branching point (BP) function, downlink service flows from different branches are sent to UE. The UPF may be referred to as a BP UPF. The BP UPF may further forward an uplink service flow to different anchor UPFs on different branches. For example, the anchor UPF 1 is a local user plane function network element, and the anchor UPF 2 is a remote user plane function network element. One UPF may have functions of both the BP UPF and the anchor UPF.

For example, in the single-session and multi-session anchor scenario, an I-UPF exists in the data path of the PDU session. The I-UPF may be the ULCL UPF in FIG. 3A, or the BP UPF in FIG. 3B.

Figure 1A:
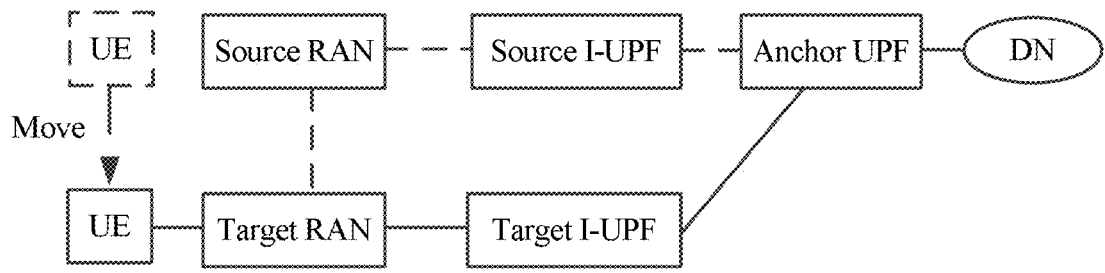
FIG. 1A is a schematic diagram of re-allocation of a user plane function network element.
Figure 1B:
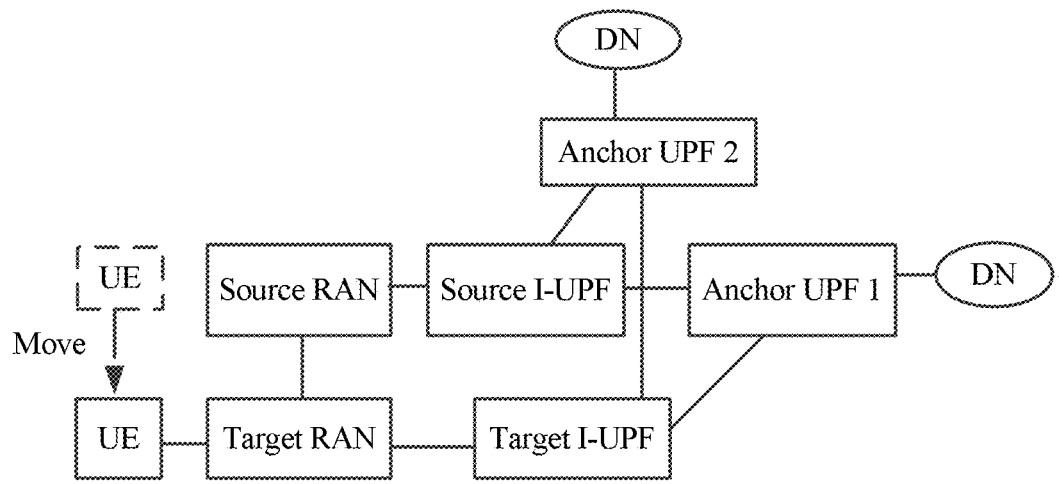
FIG. 1B is a schematic diagram of re-allocation of a user plane function network element in a single-session and multi-session anchor scenario.

When the UE 201 moves, an RAN handover is triggered, and the RAN handover may cause re-allocation of the I-UPF. The re-allocation of the I-UPF may also be referred to as redirection. When the I-UPF is re-allocated, it is shown in FIG. 1B. Before the UE moves, an established PDU session may be offloaded by using a source I-UPF. For example, the source I-UPF has two session branches, a branch 1 corresponds to the anchor UPF 1, and a branch 2 corresponds to the anchor UPF 2. When the re-allocation of the I-UPF occurs, there may be two cases. A case 1, both branches are switched to a target side. A case 2, only a primary branch (such as branch 1) is switched to the target side, while a secondary branch (such as branch 2) is not switched.

For either of the foregoing cases, when any branch (such as branch 1) in the PDU session is switched, after all data packets on the switched branch are sent, the anchor UPF corresponding to the switched branch sends an end marker to a target RAN via a source RAN. After receiving the end marker, the target RAN considers that transmission of downlink data packets on old paths ends, and starts to send a downlink data packets received on new paths to the UE. However, transmission of downlink data packets on another branch (such as branch 2) in the PDU session may not be completed. Because these data packets are received after the end marker is received, the target RAN directly discards these data packets. This causes a data packet loss, reducing user experience.

To resolve the foregoing technical problem, this application provides a plurality of solutions.

Figure 4A:
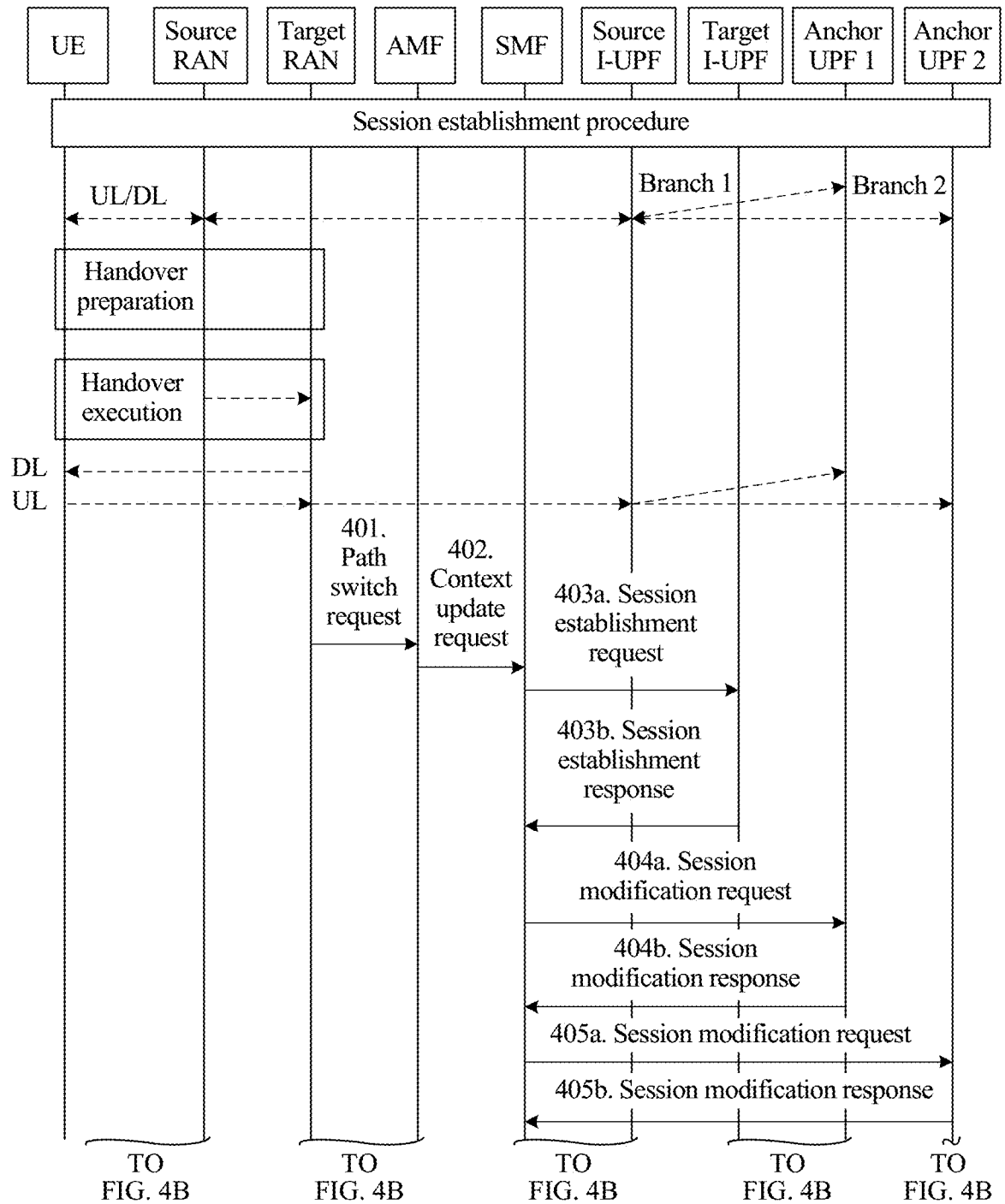

FIG. 4A and FIG. 4B and FIG. 5 are respectively a signaling interaction diagram and a flowchart of a first transmission control method according to an embodiment of this application. By means of control in the first solution, only a first anchor user plane function network element in a plurality of anchor user plane function network elements sends an end marker.

FIG. 4A and FIG. 4B show interaction between UE, a source RAN, a target RAN, an AMF, an SMF, a source I-UPF, a target I-UPF, an anchor UPF 1, and an anchor UPF 2. For example, the UE may be UE 201 in FIG. 2A or UE 201' in FIG. 2B. The source RAN or the target RAN may be an AN device 202 in FIG. 2A or an AN device 202' in FIG. 2B. The AMF may be an AMF network element 203 in FIG. 2A or an AMF network element 203' in FIG. 2B. The SMF may be an SMF network element 204 in FIG. 2A or an SMF network element 204' in FIG. 2B. The source I-UPF, the target I-UPF, the anchor UPF 1, or the anchor UPF 2 may be a UPF network element 205 in FIG. 2A or a UPF network element 205' in FIG. 2B. In a ULCL scenario, an I-UPF is a ULCL UPF. In an IPv6 multi-homing session scenario, the I-UPF is a BP UPF.

In an example of FIG. 4A and FIG. 4B, a PDU session has two branches, respectively corresponding to the anchor UPF 1 and the anchor UPF 2. However, this application is not limited thereto, and the PDU session may further have another quantity of a plurality of branches (or referred to as paths).

As shown in FIG. 4A and FIG. 4B, the method includes the following steps.

Before the UE moves, the PDU session between the UE and a DN may be established by using a session establishment procedure. The PDU session has a branch 1 corresponding to the anchor UPF 1 and a branch 2 corresponding to the anchor UPF 2. In this case, paths of an uplink (UL)/downlink (DL) data packets includes one path passing through the UE, the source RAN, the source I-UPF, and the anchor UPF 1; and another path passing through the UE, the source RAN, the source I-UPF, and the anchor UPF 2.

The movement of the UE triggers an RAN handover. For example, the RAN handover may be an Xn-based handover. The RAN handover includes at least a handover preparation phase and a handover execution phase. After the handover preparation phase, the target RAN may serve the UE. For example, paths of the uplink data packets includes one path passing through the UE, the target RAN, the source I-UPF, and the anchor UPF 1; and another path passing through the UE, the target RAN, the source I-UPF, and the anchor UPF 2. The downlink data packet is sent to the UE through a forwarding tunnel between the source RAN and the target RAN.

Step 401. A target RAN sends a path switch request to an AMF.

For example, after the handover execution phase, the target RAN sends the path switch request to the AMF, so as to notify the AMF that the UE has moved to a new target cell. The path switch request may be an N2 path switch request. The path switch request carries a to-be-switched PDU session and session management (SM) information. For example, the SM information is N2 SM information, and the N2 SM information includes information about the target RAN. The information about the target RAN may include an address and tunnel information of the target RAN. For example, the tunnel information of the target RAN includes an uplink tunnel identifier and a downlink tunnel identifier of the target RAN.

Step 402. The AMF sends a context update request to an SMF.

For example, the AMF may send a request to the SMF, and invoke a service of the SMF, Nsmf_PDU Session_Update SM Context. The request for invoking the service carries the to-be-switched PDU session, the SM information, and location information of the UE.

After receiving the request, the SMF determines whether a current UPF (e.g., the source I-UPF) can continue to serve the UE. When the source I-UPF cannot continue to serve the UE, the SMF selects the target I-UPF based on the location information of the UE.

Step 403a. The SMF sends a session establishment request to a target I-UPF.

The session establishment request is used to request to establish an N4 session between the SMF and the target I-UPF. For example, the session establishment request is an N4 session establishment request. The session establishment request includes the information about the target RAN.

Step 403b. The target I-UPF sends a session establishment response to the SMF.

After receiving the session establishment request, the target I-UPF feeds back the session establishment response to the SMF. For example, the session establishment response is an N4 session establishment response. The session establishment response includes information about the target I-UPF. The information about the target I-UPF may include at least one of an address and tunnel information of the target I-UPF. For example, the tunnel information of the target I-UPF includes at least a tunnel identifier of a downlink user plane of the target I-UPF.

Step 404a. The SMF sends a session modification request to an anchor UPF 1.

Step 404b. The anchor UPF 1 sends a session modification response to the SMF.

Step 405a. The SMF sends a session modification request to an anchor UPF 2.

Step 405b. The anchor UPF 2 sends a session modification response to the SMF.

Steps 404a to 405b are used to update user plane information of an anchor UPF on each branch. For example, the session modification request in step 404a and step 405a may be an N4 session modification request, and includes the information about the target I-UPF. Updating the user plane information of the anchor UPF refers to updating information about the source I-UPF stored in the anchor UPF into the information about the target I-UPF. After update of the user plane information is completed, it may be considered that path switch (or referred to as path update) is completed. The session modification response in step 404b and step 405b may be an N4 session modification response.

If the SMF determines to switch only some branches in the PDU session, only the user plane information of the anchor UPF on the to-be-switched branch may be updated. In this case, for an un-switched branch, the session modification request may not be sent, so that the user plane information is not updated. Alternatively, the SMF may indicate to, by using the session modification request, an anchor user plane function network element on the un-switched branch to stop transmission of the downlink data packet.

In a first transmission control solution, the SMF indicates to only one anchor user plane (which may be referred to as a first anchor user plane function network element) in a plurality of anchor user plane function network elements to send an end marker.

Optionally, after the SMF updates user plane information of at least one anchor user plane function network element in the plurality of anchor user plane function network elements other than the first anchor user plane function network element, the SMF indicates to the first anchor user plane function network element to send the end marker.

In the example in FIG. 4A and FIG. 4B, it is assumed that both the branch 1 and the branch 2 are to be switched. The SMF first updates user plane information of the anchor UPF 1 by using steps 404a and 404b. Then, the SMF updates user plane information of the anchor UPF 2 by using steps 405a and 405b. After step 404b, the SMF may indicate to the anchor UPF 2 to send the end marker on the branch 2.

In a first possible implementation, the SMF may indicate to, by using the session modification request in step 405a, the anchor UPF 2 to send the end marker on the branch 2. For example, the session modification request in step 405a has two functions, (1) requesting to update the user plane information of the anchor UPF 2; (2) indicating to the anchor UPF 2 to send the end marker on the branch 2. For example, the session modification request in step 405a carries indication information used to indicate to the anchor UPF 2 to send the end marker.

In a second possible implementation, the SMF may indicate to, by using another message (such as a first message), the anchor UPF 2 to send the end marker on the branch 2, as shown in step 405c. In other words, after updating the user plane information of the anchor UPF 2 in steps 405a and 405b, the SMF may indicate to, by using the first message, the anchor UPF 2 to send the end marker on the branch 2. For example, the first message carries indication information used to indicate to the anchor UPF 2 to send the end marker. The first message may also be a session modification request. However, a difference from the first implementation is that the session modification request used to request to update the user plane information of the anchor UPF 2 and the session modification request used to indicate to the anchor UPF 2 to send the end marker on the branch 2 may be implemented by two different messages.

In the foregoing two implementations, in the plurality of anchor user plane function network elements, only an anchor user plane function network element that last updates the user plane information sends the end marker. Optionally, before step 404a, the SMF may first select which anchor user plane function network element is the anchor user plane function network element that last updates the user plane information, in other words, select which anchor user plane function network element is the first anchor user plane function network element that sends the end marker. For example, the SMF may determine a remote user plane function network element in the ULCL or the IPv6 multi-homing session scenario, a home user plane function network element in a roaming scenario, or another anchor user plane function network element with a longest path to the UE (or the target RAN) in various anchor user plane function network elements as the first anchor user plane function network element. Optionally, the SMF may first update, based on a length of a path between the anchor user plane function network element and the UE (or the target RAN), the user plane information of the anchor user plane function network element with a relatively short path, and then update the user plane information of the anchor user plane function network element with a relatively long path. In this way, the anchor user plane function network element that last updates the user plane information is the anchor user plane function network element with the longest path to the UE (or the target RAN), namely, the first anchor user plane function network element.

Alternatively, in the second possible implementation, optionally, after the SMF updates the user plane information for each anchor user plane function network element of the to-be-switched path, the SMF determines the anchor user plane function network element that last updates the user plane information as the first anchor user plane function network element. Similarly, the SMF may first update, based on the length of the path between the anchor user plane function network element and the UE (or the target RAN), the user plane information of the anchor user plane function network element with the relatively short path, and then update the user plane information of the anchor user plane function network element with the relatively long path. In this way, the anchor user plane function network element that last updates the user plane information is the anchor user plane function network element with the longest path to the UE (or the target RAN), namely, the first anchor user plane function network element. For example, the first anchor user plane function network element includes the remote user plane function network element in the ULCL or the IPv6 multi-homing session scenario, or the home user plane function network element in the roaming scenario.

For example, in the example of FIG. 4A and FIG. 4B, in the ULCL or the IPv6 multi-homing session scenario, the anchor UPF 1 is a local user plane function network element used for local offloading, and the anchor UPF 2 is the remote user plane function network element (as shown in FIG. 3A or FIG. 3B). Therefore, the SMF indicates to only the anchor UPF 2 to send the end marker.

Further, in addition to constructing the end marker by the anchor UPF after the anchor UPF receives the indication information of the SMF, the end marker may alternatively be constructed by the SMF. Therefore, the SMF may send the end marker to only the first anchor user plane function network element in the plurality of anchor user plane function network elements, so that the first anchor user plane function network element may send the end marker on a path on which the first anchor user plane function network element is located. Details are not described herein again.

Step 406. The anchor UPF 2 sends an end marker to a source I-UPF.

For example, after receiving the indication information or the end marker sent by the SMF by using step 405*a* or 405*c*, the anchor UPF 2 sends the end marker after the path switch. However, because the anchor UPF 1 does not receive the indication information about sending the end marker, and does not receive the end marker, the anchor UPF 1 does not send the end marker.

Step 407. After receiving the end marker, the source I-UPF sends the end marker to the target RAN via a source RAN.

After receiving the end marker, the target RAN may consider that transmission of the downlink data packets on old paths ends, and starts to send the downlink data packets received on new paths to the UE. For example, the new paths of the downlink data packets includes one path passing through the anchor UPF 1, the target I-UPF, the target RAN, and the UE; and another path passing through the anchor UPF 2, the target I-UPF, the target RAN, and the UE.

Step 408. The SMF sends a context update response to the AMF.

For example, the context update response may be a response message of the invoked service "Nsmf_PDU Session_Update SM Context". The context update response carries the address of the target I-UPF and uplink tunnel information of the target I-UPF.

Step 409. The SMF sends a path switch acknowledgment to the target RAN.

For example, the path switch acknowledgment may be an N2 path switch request acknowledgment (N2 path switch request ack). The path switch acknowledgment carries the address of the target I-UPF and the uplink tunnel information of the target I-UPF.

After receiving the path switch acknowledgment, the target RAN may transmit the uplink data packets on the new paths. For example, a new path of the uplink data packet passes through the UE, the target RAN, the target I-UPF, and the anchor UPF 1; and another new path passes through the UE, the target RAN, the target I-UPF, and the anchor UPF 2.

Step 410. The target RAN notifies the source RAN to release a resource.

For example, after acknowledging that the switch succeeds, the target RAN sends a resource release message to the source RAN, so as to trigger resource release of the source RAN.

With reference to the description in FIG. 4A and FIG. 4B, as shown in FIG. 5, an embodiment of this application provides a transmission control method, including the following steps.

Step 501. In a re-allocation process of a first user plane function network element to a second user plane function network element, a session management function network element sends a respective session modification request of a plurality of session modification requests to each anchor user plane function network element of a plurality of anchor user plane function network elements, wherein each session modification request of the plurality of session modification requests includes information about the second user plane function network element.

For example, the first user plane function network element may be a source I-UPF in FIG. 4A and FIG. 4B, the second user plane function network element may be a target I-UPF in FIG. 4A and FIG. 4B, and the session management function network element may be an SMF in FIG. 4A and FIG. 4B. The plurality of anchor user plane function network elements may include an anchor UPF 1 and an anchor UPF 2 in FIG. 4A and FIG. 4B.

For step 501, refer to descriptions of steps 404*a* and 405*a* in FIG. 4A and FIG. 4B, and details are not described herein again.

Step 502. The session management function network element indicates to only a first anchor user plane function network element in the plurality of anchor user plane function network elements to send an end marker; or the session management function network element sends the end marker to only the first anchor user plane function network element.

For example, the first anchor user plane function network element may be the anchor UPF 2 in FIG. 4A and FIG. 4B.

For example, the session management function network element indicates to, by using the session modification request sent to the first anchor user plane function network element, the first anchor user plane function network element to send the end marker, or the session modification request includes the end marker; or the session management function network element indicates to, by using a first message sent to the first anchor user plane function network element, the first anchor user plane function network element to send the end marker, or the first message includes the end marker.

For step 502, refer to a description of step 405*a* or 405*c* in FIG. 4A and FIG. 4B, and details are not described herein again.

For example, the step 501 includes first sending, by the session management function network element, a respective first session modification request to each anchor user plane function network element other than the first anchor user plane function network element in the plurality of anchor user plane function network elements, and then sending a second session modification request to the first anchor user plane function network element. In other words, the first anchor user plane function network element is an anchor user plane function network element that last receives the session modification request and updates a path in the plurality of anchor user plane function network elements. Therefore, the session management function network element indicates to only the anchor user plane function network element that last updates the path to send the end marker. In this way, when the anchor user plane function network element that last updates the path sends the end marker, each of the anchor user plane function network elements in the plurality of anchor user plane function network elements except the first anchor user plane function network element has completed path switch, in other words, has completed transmission of a downlink data packet on a corresponding branch. Therefore, the end marker sent by the anchor user plane function network element that last updates the path is used to indicate that packet transmission on old paths is completed. Therefore, using the foregoing method may avoid a data packet loss on the old paths, improving user experience.

Optionally, after the session management function network element sends the respective session modification request to each anchor user plane function network element in the plurality of anchor user plane function network elements except the first anchor user plane function network element, step 502 may be performed. For example, if the plurality of anchor user plane function network elements include anchor user plane function network elements A, B, and C, and the first anchor user plane function network element is the anchor user plane function network element C, after sending the respective modification request to each of the anchor user plane function network elements A and B, the session management function network element may indicate to the anchor user plane function network element C to send the end marker, or send the end marker to the anchor user plane function network element C. As described above, the session modification request or another message sent to the anchor user plane function network element C may be used to indicate to the anchor user plane function network element C to send the end marker, or send the end marker to the anchor user plane function network element C. Details are not described herein again. When the session modification request sent to the anchor user plane function network element C is used to indicate to the anchor user plane function network element C to send the end marker, or send the end marker to the anchor user plane function network element C, signaling interaction may be further reduced, so as to save a network resource.

Optionally, the method further includes determining, by the session management function network element, the first anchor user plane function network element. For example, the session management function network element may designate a specific anchor user plane function network element as the first anchor user plane function network element that sends the end marker. For example, the session management function network element may determine the first anchor user plane function network element before sending the respective session modification request to each of the plurality of anchor user plane function network elements, or determine the first anchor user plane function network element after sending the respective session modification request to each of the plurality of anchor user plane function network elements.

For example, the specific anchor user plane function network element may include a remote user plane function network element, a home user plane function network element, or an anchor user plane function network element with a longest path to UE (or a target RAN) in various anchor user plane function network elements. When the specific anchor user plane function network element is the anchor user plane function network element that last updates the path, the foregoing effect may be achieved. Even if the first anchor user plane function network element is not the anchor user plane function network element that last updates the path, when the first anchor user plane function network element sends the end marker after updating the path, transmission of a data packet on another old path is basically completed. Therefore, a data packet loss on the old path may be reduced, and user experience is improved.

Figure 6A:
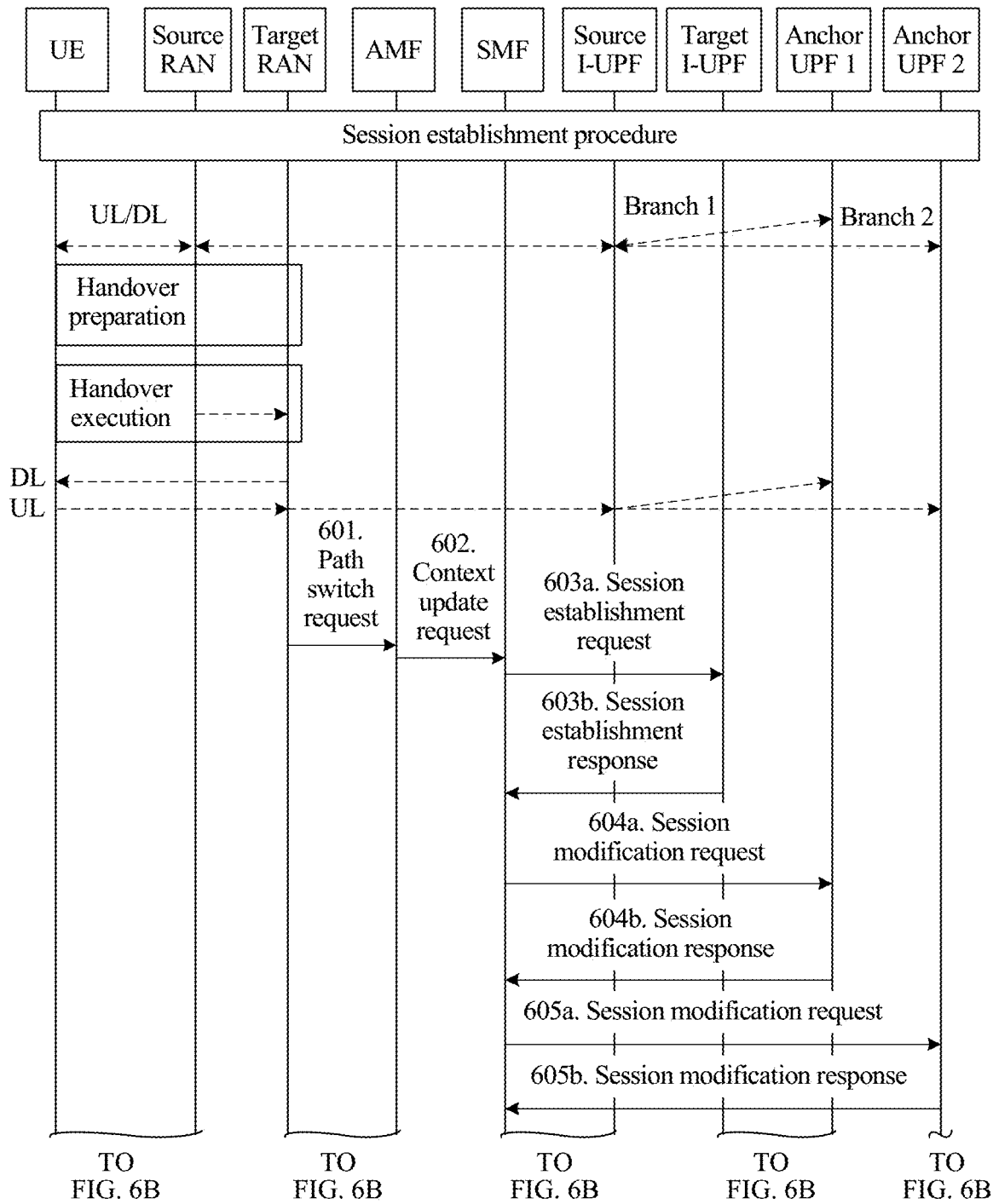

FIG. 6A and FIG. 6B are a signaling interaction diagram of a second transmission control method according to an embodiment of this application. According to the second solution, after receiving end markers sent by a plurality of anchor user plane function network elements, a source I-UPF sends an end marker to a target RAN via a source RAN.

Similarly, FIG. 6A and FIG. 6B show interaction between UE, the source RAN, the target RAN, an AMF, an SMF, the source I-UPF, a target I-UPF, an anchor UPF 1, and an anchor UPF 2. For details, refer to a description in FIG. 4A and FIG. 4B, and details are not described again.

As shown in FIG. 6A and FIG. 6B, the method includes the following steps.

Step 601. A target RAN sends a path switch request to an AMF.

Step 602. The AMF sends a context update request to an SMF.

Step 603*a*. The SMF sends a session establishment request to a target I-UPF.

Step 603*b*. The target I-UPF sends a session establishment response to the SMF.

Step 604*a*. The SMF sends a session modification request to an anchor UPF 1.

Step 604*b*. The anchor UPF 1 sends a session modification response to the SMF.

Step 605*a*. The SMF sends a session modification request to an anchor UPF 2.

Step 605*b*. The anchor UPF 2 sends a session modification response to the SMF.

For steps 601 to 605*b* and a related operation before step 601, refer to descriptions of steps 401 to 405*b* in FIG. 4A and FIG. 4B, and details are not described herein again.

Step 606. The SMF sends first indication information to a source I-UPF. The first indication information indicates to the source I-UPF to send, after receiving the end marker sent on each branch, an end marker to an access network device. Alternatively, the first indication information indicates to the source I-UPF to send, after receiving a last end marker, the last received end marker to the access network device.

For example, the first indication information includes quantity information. The quantity information indicates a quantity of paths for sending the end marker in a plurality of paths. In the second solution, in other words, the quantity information indicates a quantity of to-be-switched paths in the plurality of paths. The quantity information may be a specific value for the quantity of the paths for sending the end marker in the plurality of paths. Alternatively, the quantity information may be tunnel information of a path for sending the end marker in the plurality of paths. In an example in FIG. 6A and FIG. 6B, the quantity information may be 2, indicating that end markers are sent on two paths; or the quantity information may be tunnel information of a branch 1 and a branch 2, indicating that the end markers are sent on the two paths, the branch 1 and the branch 2.

For example, the SMF sends a session modification request to the source I-UPF, where the session modification request includes the first indication information. Optionally, after receiving the session modification request, the source I-UPF returns a session modification response to the SMF.

In the example in FIG. 6A and FIG. 6B, the SMF sends the first indication information to the source I-UPF in a re-allocation process of an I-UPF. It should be noted that, an occasion for performing step 606 is not limited in this application, and the SMF may perform step 606 at any moment after step 602 in the re-allocation process of the I-UPF. Alternatively, the SMF may send the first indication information to the source I-UPF before the re-allocation of the I-UPF. For example, in a process of inserting the source I-UPF, the SMF may send the first indication information to the source I-UPF. Optionally, the source I-UPF may be inserted in a session establishment procedure, or the source I-UPF may be inserted after the session establishment procedure ends.

Step 607. The SMF sends second indication information to the source I-UPF. The second indication information is used for detection of a downlink data packet of a first session at the source I-UPF.

Similarly, in the example in FIG. 6A and FIG. 6B, the SMF sends the second indication information to the source I-UPF in the re-allocation process of the I-UPF. It should be noted that, an occasion for performing step 607 is not limited in this application, and the SMF may perform step 607 at any moment after step 602 in the re-allocation process of the I-UPF. Alternatively, the SMF may send the second indication information to the source I-UPF before the re-allocation of the I-UPF. For example, in the process of inserting the source I-UPF, the SMF may send the second indication information to the source I-UPF. Optionally, the source I-UPF may be inserted in the session establishment procedure, or the source I-UPF may be inserted after the session establishment procedure ends.

The first session is a session corresponding to the branch 1 and the branch 2.

Step 608a. After completing path switch, an anchor UPF 1 sends an end marker 1 to the source I-UPF.

Step 608b. After completing path switch, an anchor UPF 2 sends an end marker 2 to the source I-UPF.

The source I-UPF detects the received downlink data packet of the first session based on the second indication information, and determines the downlink data packet as the end marker based on a detection result. For example, the source I-UPF receives the respective downlink data packet on the branch 1 and the branch 2, and each of the downlink data packet includes a packet header and data. The branch 1 and the branch 2 are session branches of the first session. Therefore, the downlink data packets transmitted on the branches 1 and the branch 2 are the downlink data packets of the first session. The source I-UPF detects the respective received downlink data packet, and determines the downlink data packet of the first session as the end marker based on the packet header. Therefore, the source I-UPF learns that the end marker 1 and the end marker 2 are received.

Step 609. After receiving the end marker on a first path, the source I-UPF sends, based on the first indication information, the end marker to the target RAN via a source RAN. The first path is a path for last sending the end marker.

In other words, after receiving the respective end marker sent on each branch (or in other words, after receiving a last-sent end marker), the source I-UPF sends the end marker to the target RAN via the source RAN. In the example in FIG. 6A and FIG. 6B, the branch 2 is the path for last sending the end marker.

For example, the source I-UPF determines the branch 2 as the first path based on the first indication information. When the source I-UPF receives the end marker whose quantity is equal to a quantity indicated by the quantity information, the source I-UPF determines the path for last sending the end marker, namely, the branch 2, as the first path. For example, when the first indication information is the specific value for the quantity of the paths for sending the end marker in the plurality of paths, for example, "2", after receiving two end markers, the source I-UPF determines the path for last sending the end marker as the first path. Alternatively, when the quantity information is the tunnel information of the path for sending the end marker in the plurality of paths, for example, tunnel information of the branch 1 and the branch 2, after receiving end markers sent on the branch 1 and the branch 2, the source I-UPF determines the branch 2 for last sending the end marker as the first path.

Optionally, for an end marker previously received on another path, for example, the end marker 1 received on the branch 1, the source I-UPF may discard the end marker.

After receiving the end marker, the target RAN may consider that transmission of the downlink data packets on old paths ends, and starts to send downlink data packets received on new paths to the UE. For example, the new paths of the downlink data packets includes one path passing through the anchor UPF 1, the target I-UPF, the target RAN, and the UE; and another path passing through the anchor UPF 2, the target I-UPF, the target RAN, and the UE.

Step 610. The SMF sends a context update response to the AMF.

Step 611. The SMF sends a path switch acknowledgment to the target RAN.

Step 612. The target RAN notifies the source RAN to release a resource.

For steps 610 to 612, refer to descriptions of steps 408 to 410 in FIG. 4A and FIG. 4B, and details are not described herein again.

The solution in FIG. 6A and FIG. 6B is applicable to a scenario in which there are at least two to-be-switched paths in the plurality of paths. If before the re-allocation of the I-UPF, the source I-UPF transceives data packets on two paths, as described in FIG. 6A and FIG. 6B, the two paths are to be switched. If before the re-allocation of the I-UPF, the source I-UPF transceives data packets on a plurality of paths more than two paths, there are at least two to-be-switched paths in the plurality of paths, and there may be another un-switched path. For the un-switched path, the SMF does not indicate to an anchor user plane function network element on the un-switched path to send the end marker, and does not send the end marker to the anchor user plane function network element on the un-switched path. In addition, as described in FIG. 4A and FIG. 4B, for the un-switched path, the SMF may not send the session modification request, so that user plane information is not updated. Alternatively, the SMF may indicate to, by using the session modification request, the anchor user plane function network element on the un-switched path to stop transmission of the downlink data packet.

For example, before the re-allocation of the I-UPF, the source I-UPF transceives the data packets on three paths, and the three paths are paths a, b, and c. When all the three paths are to be switched, the first indication information may be 3, or tunnel information of the paths a, b, and c, indicating that end markers are to be sent on the three paths. After receiving three end markers, the source I-UPF sends an end marker to the target RAN via the source RAN. If only the paths a and b in the three paths are to be switched, and the path c is not switched, the first indication information may be 2, or tunnel information of the paths a and b, indicating that end markers are to be sent on the two paths. After receiving two end markers, the source I-UPF sends an end marker to the target RAN via the source RAN.

In addition, for a scenario in which there is an un-switched path in the plurality of paths, this application further provides a third solution. Similar to the second solution, after receiving the end markers sent by the plurality of anchor user plane function network elements, the source I-UPF sends an end marker to the target RAN via the source RAN. However, for the un-switched path, the session management function network element still indicates to the anchor user plane function network element on the un-switched path to send the end marker, or send the end marker to the anchor user plane function network element. Correspondingly, after receiving indication information or the end marker, the anchor user plane function network element on the un-switched path sends the end marker to the source I-UPF. In other words, the end marker needs to be sent on the path regardless of whether the path is switched.

In the third solution, after receiving the end markers sent by the plurality of anchor user plane function network elements, the source I-UPF may send, based on the first indication information sent by the SMF, an end marker to the target RAN via the source RAN. For a related description of the first indication information, refer to FIG. 6A and FIG. 6B. Details are not described herein again. Alternatively, the source I-UPF may be configured to after receiving the end markers sent by the plurality of anchor user plane function network elements, send an end marker to the target RAN via the source RAN.

In addition, because the first indication information (the quantity information) may be used to indicate the quantity of the paths for sending the end marker in the plurality of paths, and in the third solution, the end marker needs to be sent on each path regardless of whether the path is switched, the first indication information (the quantity information) may be used to indicate a quantity of the plurality of paths.

Similar to the second solution, the source I-UPF receives the second indication information from the SMF, and detects the downlink data packet of the first session based on the second indication information, so as to learn that the downlink data packet is an end marker. For a related description of the second indication information, refer to FIG. 6A and FIG. 6B. Details are not described herein again.

With reference to the second and third solutions, as shown in FIG. 7A, an embodiment of this application provides a transmission control method, including the following steps.

Step 701. A first user plane function network element transceives data packets on a plurality of paths.

For example, the first user plane function network element may be a source I-UPF in FIG. 6A and FIG. 6B. The plurality of paths may be a branch 1 and a branch 2 in FIG. 6A and FIG. 6B.

Step 702. After receiving a first end marker on a first path, the first user plane function network element sends the first end marker to an access network device, where the first path is a path for last sending an end marker in the plurality of paths.

For example, the first path may be the branch 2 in FIG. 6A and FIG. 6B, and the first end marker is an end marker 2 sent on the branch 2. The access network device may be a source RAN in FIG. 6A and FIG. 6B. Because the first end marker is forwarded by the source RAN and finally sent to a target RAN, the access network device may also be understood as a target RAN in FIG. 6A and FIG. 6B.

For step 702, refer to a description of step 609 in FIG. 6A and FIG. 6B, and details are not described herein again.

According to the transmission control solution, the first user plane function network element sends, after receiving the last sent end marker, the end marker to the access network device. In this way, when the anchor user plane function network element that last updates the path sends the end marker, the another anchor user plane function network element has completed path switch, in other words, has completed transmission of a downlink data packet on a branch. Therefore, the end marker, sent by the anchor user plane function network element that last updates the path, is used to indicate that packet transmission on old paths is completed. Therefore, using the foregoing method may avoid a data packet loss on the old path, improving user experience.

For the end marker that is not last sent, for example, an end marker 1 sent on the branch 1, the first user plane function network element may send, to the access network device, the end marker that is not last sent together with the last sent end marker. Alternatively, the first user plane function network element may directly discard the end marker that is not last sent. Optionally, the method further includes receiving, by the first user plane function network element, a second end marker on a second path in the plurality of paths, and discarding the second end marker. The second path is any path for not last sending the end marker in the plurality of paths. In this way, a storage resource of the first user plane function network element may be saved. For example, the second path may be the branch 1 in FIG. 6A and FIG. 6B, and the second end marker is the end marker 1 sent on the branch 1.

Optionally, the method further includes receiving, by the first user plane function network element, first indication information from a session management function network element, where the first indication information indicates to the first user plane function network element to send, after receiving the first end marker on the first path, the first end marker to the access network device. For example, the session management function network element may be an SMF in FIG. 6A and FIG. 6B.

For this step, refer to a description of step 606 in FIG. 6A and FIG. 6B. For example, in a process of inserting the first user plane function network element, or in a process of re-allocating the first user plane function network element, the first user plane function network element may receive the first indication information from the session management function network element. The first indication information includes quantity information, and the quantity information indicates a quantity of paths for sending the end marker in the plurality of paths. Therefore, the first user plane function network element may determine the first path based on the first indication information. For example, when receiving the end marker whose quantity is equal to the quantity of the paths for sending the end marker in the plurality of paths, the first user plane function network element determines the path for last sending the end marker as the first path.

Optionally, the data packets transceived on the plurality of paths are data packets of a first session. The method further includes receiving, by the first user plane function network element, second indication information from the session management function network element; detecting a downlink data packet of the first session based on the second indication information; and determining the downlink data packet as the end marker based on a detection result.

For this step, refer to a description of step 607 in FIG. 6A and FIG. 6B. For example, in the process of inserting the first user plane function network element, or in the process of re-allocating the first user plane function network element, the first user plane function network element may receive the second indication information from the session management function network element.

FIG. 7B shows a transmission control method according to an embodiment of this application, and the method includes the following steps.

Step 711. A session management function network element determines that a first user plane function network element transceives data packets of a first session on a plurality of paths.

Step 712. The session management function network element sends first indication information to the first user plane function network element. The first indication information is used for determination of a first path and indicates to the first user plane function network element to send, after receiving a first end marker on the first path, the first end marker to an access network device. The first path is a path for last sending the end marker in the plurality of paths.

For step 712, refer to a description of step 606 in FIG. 6A and FIG. 6B, and details are not described herein again.

According to the foregoing method, the session management function network element sends the first indication information to the first user plane function network element. The first user plane function network element sends, after receiving the last sent end marker, the end marker to the access network device based on the first indication information. In this way, the end marker, sent by the anchor user plane function network element that last updates the path, indicates that the packet transmission on the old paths is completed. Therefore, using the foregoing method may avoid a data packet loss on the old paths, improving user experience.

Optionally, the first indication information includes the quantity information, and the quantity information indicates the quantity of the paths for sending the end marker in the plurality of paths.

Optionally, that the session management function network element sends first indication information to the first user plane function network element includes in the process of inserting the first user plane function network element, or in the process of re-allocating the first user plane function network element, sending, by the session management function network element, the first indication information to the first user plane function network element.

Optionally, the method further includes sending, by the session management function network element, the second indication information to the first user plane function network element, where the second indication information is used for detection of the downlink data packet of the first session at the first user plane function network element. For example, in the process of inserting the first user plane function network element, or in the process of re-allocating the first user plane function network element, the session management function network element sends the second indication information to the first user plane function network element.

Optionally, for the foregoing third solution, the method further includes determining, by the session management function network element, that a third path in the plurality of paths of the first session is not switched; and sending, by the session management function network element, an end marker or third indication information to an anchor user plane function network element corresponding to the third path, where the third indication information indicates to the anchor user plane function network element to send an end marker on the third path. In other words, the end marker needs to be sent on the path regardless of whether the path is switched.

In the foregoing embodiments provided in this application, various solutions of the transmission control method provided in the embodiments of this application are described separately from perspectives of each network element and interaction between network elements. It may be understood that, to implement the foregoing functions, each network element, such as the session management function network element or the first user plane function network element, includes a corresponding hardware structure and/or software module used to perform each function. A person skilled in the art should easily be aware that, units and algorithm steps in the examples described with reference to the embodiments provided in this specification may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

For example, when the foregoing network element implements a corresponding function by using a software module, a transmission control apparatus may include a processing module 801 and a sending module 802, as shown in FIG. 8. The apparatus may be a session management function network element or a chip.

In an embodiment, the apparatus may be configured to perform an operation of an SMF in FIG. 4A or FIG. 4B or a session management function network element (such as an SMF) in FIG. 5. For example, the sending module 802 is configured to in a re-allocation process of a first user plane function network element to a second user plane function network element, send a respective session modification request of a plurality of session modification requests to each anchor user plane function network element of a plurality of anchor user plane function network elements. The session modification request includes information about the second user plane function network element. The processing module 801 is configured to indicate to, by using the sending module 802, only a first anchor user plane function network element in the plurality of anchor user plane function network elements to send an end marker; or configured to send, by using the sending module 802, the end marker to only the first anchor user plane function network element.

Optionally, the sending module 802 is configured to first send a respective first session modification request to each anchor user plane function network element other than the first anchor user plane function network element in the plurality of anchor user plane function network elements, and then send a second session modification request to the first anchor user plane function network element. Therefore, the session management function network element indicates to only an anchor user plane function network element that last updates a path to send the end marker. In this way, the end marker, sent by the anchor user plane function network element that last updates the path, is used to indicate that packet transmission on old paths is completed, so as to avoid a data packet loss on the old path and improve user experience.

Optionally, after the sending module 802 sends the respective session modification request to each anchor user plane function network element other than the first anchor user plane function network element in the plurality of anchor user plane function network elements, the processing module 801 is configured to indicate to, by using the sending module 802, the first anchor user plane function network element to send the end marker, or send the end marker to the first anchor user plane function network element. For example, the processing module 801 is configured to indicate to, by using the session modification request sent to the first anchor user plane function network element, the first anchor user plane function network element to send the end marker, or the session modification request includes the end marker; or the processing module 801 is configured to indicate to, by using a first message sent to the first anchor user plane function network element, the first anchor user plane function network element to send the end marker, or the first message includes the end marker.

Optionally, the processing module 801 is further configured to determine the first anchor user plane function network element. For example, the first anchor user plane function network element includes a remote user plane function network element or a home user plane function network element.

In another embodiment, the apparatus may be configured to perform an operation of an SMF in FIG. 6A or FIG. 6B or a session management function network element (such as an SMF) in FIG. 7B. For example, the processing module 801 is configured to determine that the first user plane function network element transceives data packets of a first session on a plurality of paths. The sending module 802 is configured to send first indication information to the first user plane function network element, where the first indication information is used for determination of a first path and indicates to the first user plane function network element to send, after receiving a first end marker on the first path, the first end marker to an access network device, and the first path is a path for last sending an end marker in the plurality of paths.

Therefore, the session management function network element sends the first indication information to the first user plane function network element. The first user plane function network element sends the end marker to the access network device based on the first indication information after receiving the last sent end marker. In this way, the end marker, sent by the anchor user plane function network element that last updates the path, is used to indicate that the packet transmission on the old paths is completed, so as to avoid a data packet loss on the old path and improve user experience.

Optionally, the first indication information includes quantity information, and the quantity information indicates a quantity of paths for sending the end marker in the plurality of paths.

Optionally, the sending module 802 is configured to in a process of inserting the first user plane function network element, or in a process of re-allocating the first user plane function network element, send the first indication information to the first user plane function network element.

Optionally, the sending module 802 is further configured to send second indication information to the first user plane function network element, where the second indication information is used for detection of a downlink data packet of the first session at the first user plane function network element. For example, the sending module 802 is configured to in the process of inserting the first user plane function network element, or in the process of re-allocating the first user plane function network element, send the second indication information to the first user plane function network element.

Optionally, for the foregoing third solution, the processing module 801 is further configured to determine that a third path in the plurality of paths of the first session is not switched; and send, by using the sending module 802, an end marker or third indication information to an anchor user plane function network element corresponding to the third path, where the third indication information indicates to the anchor user plane function network element to send an end marker on the third path. In other words, the end marker needs to be sent on the path regardless of whether the path is switched.

For any one of the foregoing embodiments, the apparatus may further include a receiving module 803. The processing module 801, the sending module 802, and the receiving module 803 in the apparatus may further implement other operations or functions of the SMF or the session management function network element in the foregoing method, and details are not described herein again.

Figure 9:
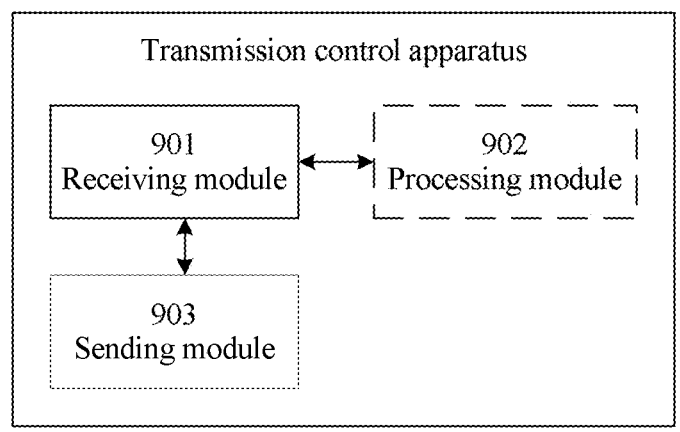
FIG. 9 is a schematic structural diagram of a transmission control apparatus according to an embodiment of this application.

Another transmission control apparatus may include a receiving module 901 and a sending module 903, as shown in FIG. 9. Optionally, the apparatus further includes a processing module 902. The apparatus may be a user plane function network element or a chip. The apparatus may be configured to perform an operation of a source I-UPF in FIG. 6A or FIG. 6B or a first user plane function network element (such as a source I-UPF) in FIG. 7A. For example, the receiving module 901 is configured to receive uplink data packets on a plurality of paths. The sending module 903 is configured to transmit downlink data packets on a plurality of paths. The sending module 903 is configured to send a first end marker to an access network device after the receiving module 901 receives the first end marker on a first path. The first path is a path for last sending an end marker in the plurality of paths.

In this way, the first user plane function network element sends, after receiving the last sent end marker, the end marker to the access network device. The end marker, sent by an anchor user plane function network element that last updates a path, is used to indicate that packet transmission on old paths is completed. Therefore, a data packet loss on the old path may be avoided, and user experience is improved.

Optionally, the processing module 902 is configured to after the receiving module 901 receives a second end marker on a second path in the plurality of paths, discard the second end marker.

Optionally, the receiving module 901 is further configured to receive first indication information from a session management function network element, where the first indication information indicates to the first user plane function network element to send, after receiving the first end marker on the first path, the first end marker to the access network device. For example, in a process of inserting the first user plane function network element, or in a process of re-allocating the first user plane function network element, the receiving module 901 is configured to receive the first indication information from the session management function network element.

Optionally, the first indication information includes quantity information, and the quantity information indicates a quantity of paths for sending the end marker in the plurality of paths. Optionally, the processing module 902 is configured to determine the first path based on the first indication information. For example, when the receiving module 901 receives the end marker whose quantity is equal to the quantity of the paths for sending the end marker in the plurality of paths, the processing module 902 is configured to determine the path for last sending the end marker as the first path.

Optionally, the receiving module 901 is further configured to receive second indication information from the session management function network element. The processing module 902 is configured to detect a downlink data packet of a first session based on the second indication information, and determine the downlink data packet as the end marker based on a detection result. For example, in the process of inserting the first user plane function network element, or in the process of re-allocating the first user plane function network element, the receiving module 901 is configured to receive the second indication information from the session management function network element.

In addition, the receiving module 901, the processing module 902, and the sending module 903 in the apparatus may further implement other operations or functions of the source I-UPF or the first user plane function network element (such as the source I-UPF) in the foregoing method, and details are not described herein again.

Figure 10:
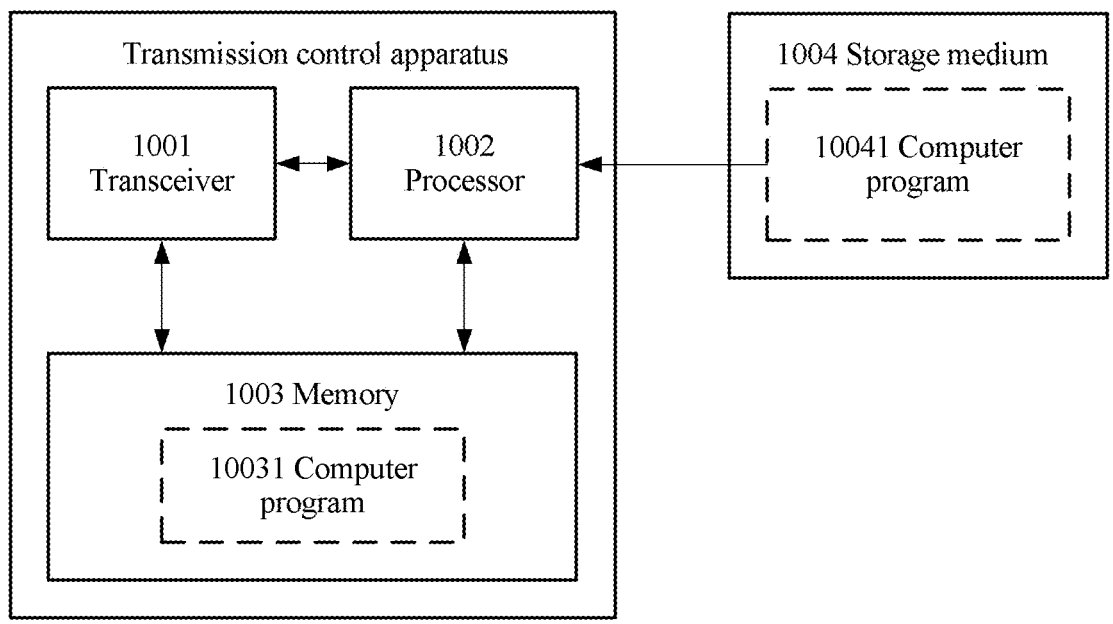
FIG. 10 is a schematic structural diagram of a transmission control apparatus according to an embodiment of this application.

FIG. 10 shows another possible schematic structural diagram of a transmission control apparatus provided in the foregoing embodiment. The apparatus includes a transceiver 1001 and a processor 1002, as shown in FIG. 10.

For example, the processor 1002 may be a general-purpose microprocessor, a data processing circuit, an application-specific integrated circuit (ASIC), or a field-programmable gate array (FPGA) circuit. The apparatus may further include a memory 1003, for example, the memory is a random access memory (RAM). The memory is configured to be coupled to the processor 1002, and store a computer program 10031 required by the apparatus.

In addition, the transmission control method provided in the foregoing embodiment further provides a computer-readable storage medium 1004 (such as a hard disk), where the computer-readable storage medium stores a computer program 10041 of the apparatus, and the computer program 10041 may be loaded to the processor 1002.

When the computer program 10031 or 10041 runs on a computer (such as the processor 1002), the computer may be enabled to perform the foregoing method.

For example, in an embodiment, the processor 1002 is configured to perform an operation or a function of the foregoing session management function network element (such as an SMF). The transceiver 1001 is configured to implement communication between the apparatus and each anchor user plane function network element or another user plane function network element or another control plane network element (such as an AMF).

In another embodiment, the processor 1002 is configured to perform an operation or a function of the foregoing first user plane function network element (such as a source I-UPF). The transceiver 1001 is configured to implement communication between the apparatus and an anchor user plane function network element or a session management function network element (such as an SMF).

The processor configured to perform the transmission control apparatus in this application may be a central processing unit (CPU), a general-purpose processor, a digital signal processor (DSP), an ASIC, a FPGA or another programmable logic device, a transistor logic device, a hardware component, or any combination thereof. The processor may implement or execute various example logical blocks, modules, and circuits that are described with reference to content provided in this application. The processor may also be a combination of processors performing a computing function, for example, one microprocessor or a combination of more than one microprocessor, or a combination of the DSP and a microprocessor.

Method or algorithm steps described with reference to the content provided in this application may be implemented by hardware, or may be implemented by a processor by executing a software instruction. The software instruction may include a corresponding software module. The software module may be stored in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a communications apparatus. Certainly, the processor and the storage medium may exist in the communications apparatus as discrete components.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present disclosure are completely or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The objectives, technical solutions, and benefits of the present disclosure are further described in detail in the foregoing specific embodiments. It should be understood that the foregoing descriptions are merely specific embodiments of the present disclosure, but are not intended to limit the protection scope of the present disclosure. Any modification, equivalent replacement, or improvement made on the basis of the technical solutions of the present disclosure shall fall within the protection scope of the present disclosure.

What is claimed is:

1. A method in a session management function network element applied when a packet data unit session has a plurality of paths corresponding to a plurality of anchor user plane function network elements connected to a first intermediate user plane function network element, wherein the method comprises:

in a process of re-allocating the first intermediate user plane function network element to a second intermediate user plane function network element, sending a respective session modification request to each anchor user plane function network element in the plurality of anchor user plane function network elements, wherein each session modification request comprises information about the second intermediate user plane function network element, wherein the first intermediate user plane function network element connects to a source radio access network, and wherein the second intermediate user plane function network element connects to a target radio access network; and indicating to only a first anchor user plane function network element in the plurality of anchor user plane function network elements to send an end marker, wherein the first anchor user plane function network element is a last anchor user plane function network element that updates a path in the plurality of paths.

2. The method of claim 1, wherein indicating to only the first anchor user plane function network element to send the end marker comprises indicating to the first anchor user plane function network element to send the end marker after sending the respective session modification request to each anchor user plane function network element other than the first anchor user plane function network element.

3. The method of claim 1, wherein the information about the second intermediate user plane function network element comprises tunnel information about the second intermediate user plane function network element.

4. The method of claim 1, wherein sending the respective session modification request comprises:
sending a respective first session modification request to each anchor user plane function network element other than the first anchor user plane function network element in the plurality of anchor user plane function network elements; and
sending, after sending the respective first session modification request, a second session modification request to the first anchor user plane function network element.

5. The method of claim 1, wherein indicating to only the first anchor user plane function network element to send the end marker comprises indicating to the first anchor user plane function network element to send the end marker using the respective session modification request sent to the first anchor user plane function network element.

6. The method according to claim 1, wherein indicating to only the first anchor user plane function network element to send the end marker comprises indicating, to the first anchor user plane function network element, to send the end marker using a first message.

7. The method of claim 1, further comprising determining that the first anchor user plane function network element corresponds to a first path in the plurality of paths.

8. The method of claim 7, wherein the first anchor user plane function network element comprises a remote user plane function network element.

9. The method of claim 7, wherein the first anchor user plane function network element comprises a home user plane function network element.

10. An apparatus applied when a packet data unit session has a plurality of paths corresponding to a plurality of anchor user plane function network elements connected to a first intermediate user plane function network element, wherein the apparatus comprises:
a processor configured to obtain a plurality of session modification requests, wherein each session modification request comprises information about a second intermediate user plane function network element; and
a transmitter coupled to the processor and configured to:
in a process of re-allocating the first intermediate user plane function network element to the second intermediate user plane function network element, send a respective session modification request to each anchor user plane function network element in the plurality of anchor user plane function network elements, wherein the first intermediate user plane function network element connects to a source radio access network, and wherein the second intermediate user plane function network element connects to a target radio access network; and
indicate to only a first anchor user plane function network element in the plurality of anchor user plane function network elements to send an end marker, wherein the first anchor user plane function network element is a last anchor user plane function network element that updates a path in the plurality of paths.

11. The apparatus of claim 10, wherein, the transmitter is further configured to indicate, by using the transmitter, to the first anchor user plane function network element to send the end marker after the transmitter sends the respective session modification request to each anchor user plane function network element other than the first anchor user plane function network element.

12. The apparatus of claim 10, wherein the information about the second intermediate user plane function network element comprises tunnel information about the second intermediate user plane function network element.

13. The apparatus of claim 10, wherein the transmitter is further configured to:
send a respective first session modification request to each anchor user plane function network element other than the first anchor user plane function network element; and
send a second session modification request to the first anchor user plane function network element.

14. The apparatus of claim 10, wherein the transmitter is further configured to indicate to the first anchor user plane function network element to send the end marker using the session modification request sent to the first anchor user plane function network element.

15. The apparatus of claim 10, wherein the processor is further configured to indicate to the first anchor user plane function network element to send the end marker using a first message.

16. The apparatus of claim 10, wherein the processor is further configured to determine the first anchor user plane function network element.

17. The apparatus of claim 10, wherein the first anchor user plane function network element comprises either a remote user plane function network element or a home user plane function network element.

18. A computer program product comprising computer-executable instructions for storage on a non-transitory computer-readable storage medium which when executed by one or more processors cause an apparatus, applied when a packet data unit session has a plurality of paths corresponding to a plurality of anchor user plane function network elements connected to a first intermediate user-plane function network element, to:
in a process of re-allocating the first intermediate user plane function network element to a second intermediate user plane function network element, send a respective session modification request to each anchor user plane function network element in the plurality of anchor user plane function network elements, wherein each session modification request comprises information about the second intermediate user plane function network element, wherein the first intermediate user plane function network element connects to a source radio access network, and wherein the second intermediate user plane function network element connects to a target radio access network; and
indicate to only a first anchor user plane function network element in the plurality of anchor user plane function network elements to send an end marker, wherein the first anchor user plane function network element is a last anchor user place function network element that updates a path in the plurality of paths.

19. The computer program product of claim 18, wherein the instructions further cause the apparatus to indicate to the first anchor user plane function network element to send the end marker after sending the respective session modification request to each anchor user plane function network element other than the first anchor user plane function network element.

20. The computer program product of claim 18, wherein the information about the second intermediate user plane function network element comprises tunnel information about the second intermediate user plane function network element.

* * * * *

UNITED STATES PATENT AND TRADEMARK OFFICE
CERTIFICATE OF CORRECTION

PATENT NO. : 11,330,493 B2
APPLICATION NO. : 16/839652
DATED : May 10, 2022
INVENTOR(S) : Li et al.

It is certified that error appears in the above-identified patent and that said Letters Patent is hereby corrected as shown below:

In the Claims

Claim 18, Column 28, Line 44, "immediate user-plane" should read "immediate user plane"

Signed and Sealed this
Twenty-eighth Day of June, 2022

Katherine Kelly Vidal
*Director of the United States Patent and Trademark Office*